Oct. 16, 1962 K. MILLER 3,058,286
POWER MOWERS
Filed July 23, 1958 2 Sheets-Sheet 1
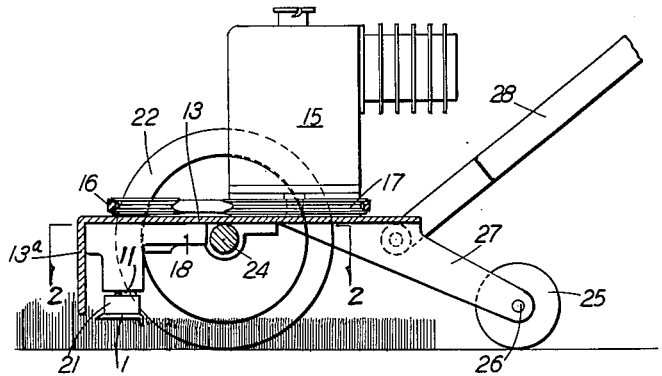
FIG. 1.
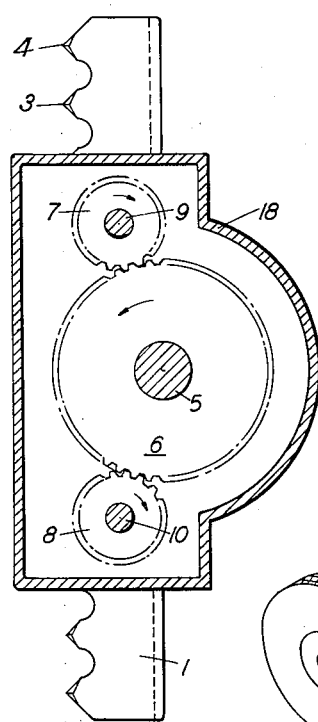
FIG. 2.
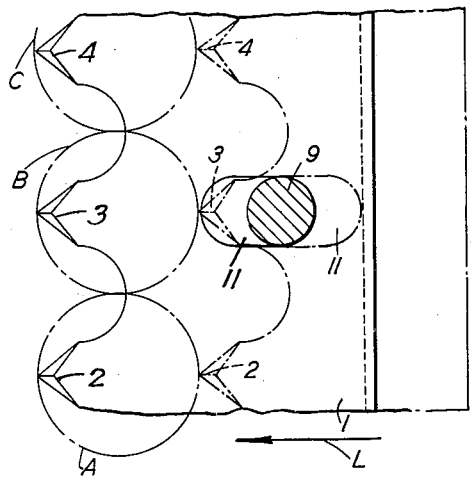
FIG. 3.
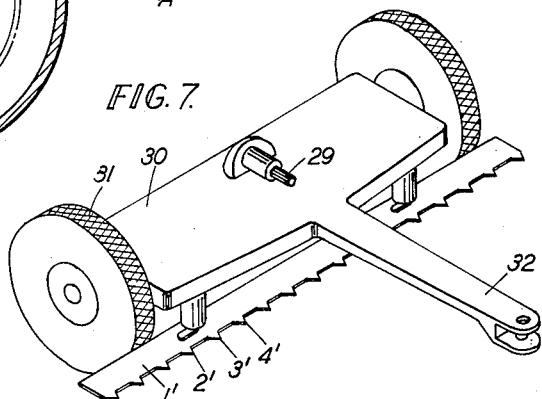
FIG. 7.
INVENTOR.
KAY MILLER
BY
ATTORNEY Oct. 16, 1962 K. MILLER 3,058,286
POWER MOWERS
Filed July 23, 1958 2 Sheets-Sheet 2
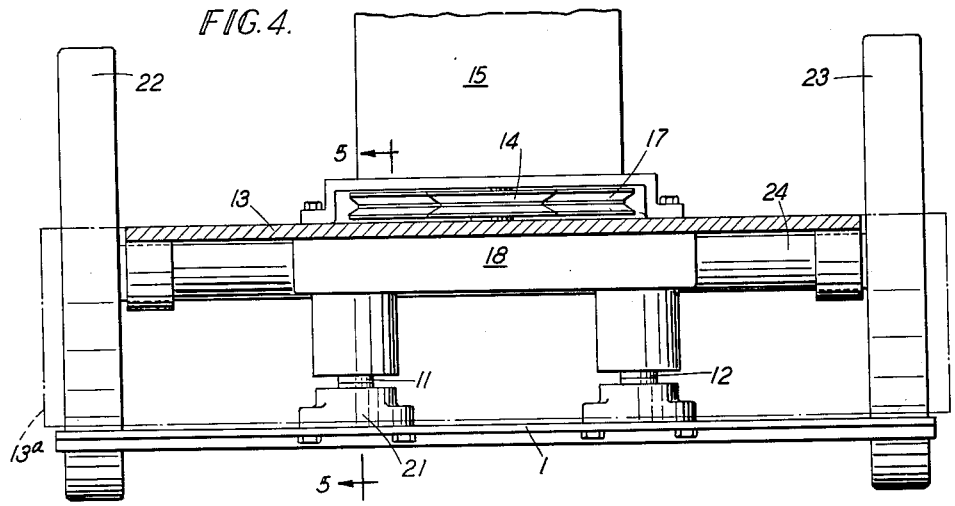
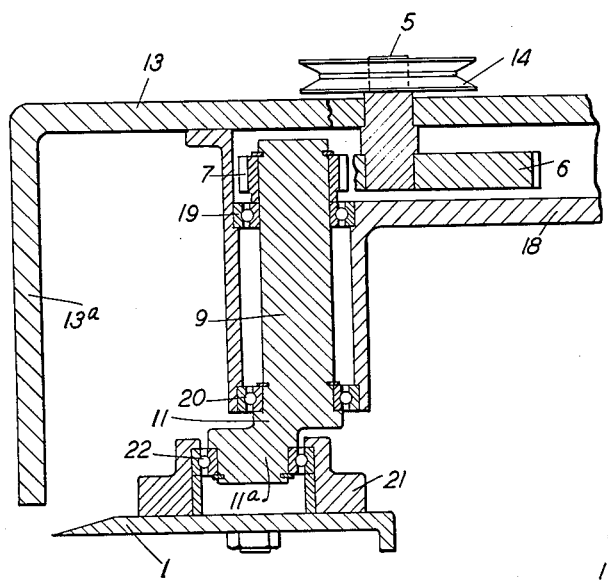
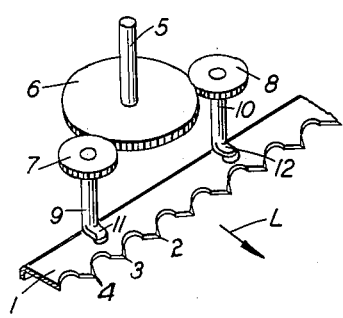
INVENTOR.
KAY MILLER
BY
ATTORNEY United States Patent Office 3,058,286
Patented Oct. 16, 1962

3,058,286
POWER MOWERS
Kay Miller, Fort Wayne, Ind., assignor to Andrew F.
Wintercorn, Rockford, Ill.
Filed July 23, 1958, Ser. No. 750,403
7 Claims. (Cl. 56—26.5)

This invention relates to powered cutting devices, and, more particularly, power mowers adapted to cut various types of growth, such as grass, weeds, etc.

At present, there are two types of lawn mowers generally available, namely, the reel type and the rotary type. Each of these types has certain advantages and disadvantages. Reel type mowers, while they cut smoothly and evenly on close residential lawns and cut well on uneven terrain, are objectionable because they are heavy to handle and therefore require power-driven wheels, they require continuous clutching and are awkward to handle on cut-up lawns and around trees and flower beds, they cannot cut close up to trees or flower beds, and cannot cut tall grass or weeds. Rotary type mowers, on the other hand, are easy to operate without power-driven wheels and can cut tall grass and weeds, but they do not provide a satisfactory cut on close residential lawns, they cut into the turf and ground on terraces and uneven terrain, and are more or less dangerous to handle. In general, therefore, the reel types are satisfactory only for close residential lawns and golf greens, and the rotary types are satisfactory only for rougher lawns and for cutting taller grass and weeds. The reel type is also handicapped by the requirement for handling foreign objects apt to be found in the grass, and therefore requires a heavy rugged construction, all out of proportion to the job of cutting grass. Adding an engine makes such a machine so heavy it cannot be handled without power drive to the wheels. In other words, the power required to cut the grass constitutes only a small fraction of the total power required to propel the machine about.

It is, therefore, the principal object of this invention to provide a new and improved type of power mower that avoids the above mentioned objections in the present conventional reel and rotary type mowers without sacrificing their advantages.

A further object is to provide a new and improved rotary type power mower having the following advantages: (1) it will provide an even cut on close and terraced lawns, without danger of scalping or digging; (2) it is not nearly as dangerous to handle; (3) it will cut close up to trees and walls, and over edges of flower beds; (4) it will cut tall grass and weeds; (5) it is compact, light weight, and easy to handle without power driven wheels; (6) it does not require excessive power for its operation, and (7) there are no close mechanical adjustments to maintain.

The objects of this invention are accomplished, briefly, in the following manner: A single cutting blade is provided having a cutting edge longitudinally thereof defined by a large number of elongated teeth arranged in laterally spaced relation in one row along its front edge. A combined rotary and reciprocatory or oscillatory motion is given this blade, so that each of the teeth, in common with every other point on the blade, is caused to describe a small circle of the same radius. The teeth are thereby made to rotate in these circles with a linear rotational velocity (tip velocity) sufficient to shear or mow the grass by themselves by a rotary scythe action, as distinguished from a shearing action obtainable between relatively reciprocable cutting teeth on a movable cutter bar and a fixed bed knife.

A detailed description of the invention follows, in which reference is made to the accompanying drawings, wherein:

FIG. 1 is a view partly in side elevation and partly in central vertical section of a lawn mower made in accordance with my invention;

FIG. 2 is a horizontal section on line 2—2 of FIG. 1;

FIG. 3 is an enlarged portion of FIG. 2 illustrating diagrammatically the new principle of operation, with the cutter teeth shown in different positions, and with dot and dash circles indicating their circular orbits;

FIG. 4 is a front view of the mower with the guard flange broken away;

FIG. 5 is a vertical section on line 5—5 of FIG. 4;

FIG. 6 is a diagrammatic perspective view of the cutter bar and its drive gearing, and FIG. 7 is a front perspective view of a farm mower utilizing the principle of this invention.

Similar reference numerals are applied to corresponding parts in these views.

Referring first to FIG. 3, which illustrates the cutting principle utilized in this invention, a single elongated metallic cutting blade 1 is provided with a cutting edge longitudinally thereof defined by a plurality of teeth such as 2, 3, and 4 arranged in laterally spaced, aligned relationship along the front edge thereof. In use, the blade 1 is so mounted as to lie in a substantially horizontal plane. The teeth 2—4 are suitably sharpened and pointed to serve as cutting teeth, and the line along which the teeth are arranged extends transversely to the direction of travel of blade 1 for cutting or mowing purposes. Thus, the blade as seen in FIG. 3 moves toward the left, as indicated by arrow L, for mowing.

The blade 1 is driven, in a manner to be more particularly described hereinafter, with a combined rotary and reciprocatory or oscillatory motion, as a unit, in a horizontal plane, such that each and every tooth on the blade describes a circle of the same radius. The circle described by tooth 2 is illustrated at A, and tooth 2 is shown at two diametrically-opposed positions on this circle. The circle described by tooth 3 is illustrated at B, and tooth 3 is similarly shown at two diametrically-opposed positions on this circle, and likewise the circle described by tooth 4 is illustrated at C. In order to completely cover the area being mowed, the diameter of each of the circles A, B, and C described by the teeth 2—4, respectively, must be at least equal to the distance between adjacent teeth, but preferably larger. Purely by way of example, but not implying any limitation, the diameter of the circles A, B and C may be about one inch.

The actual cutting or mowing is accomplished by utilization of the velocity cutting principle of the scythe or sickle. For this, the linear rotational velocity of each of the teeth 2—4, etc. along its circular path (in other words, the tip velocity of the teeth) is made sufficient to shear off the growth to be cut by a rotary scythe or sickle action. The driving means for the blade 1, to be later described in detail, is so designed that the teeth 2—4, etc. describe circles of the proper and desired diameter, and in addition so that the linear rotational velocity of the teeth is sufficient to shear off the growth to be cut or mowed, as desired.

It may be seen that this invention utilizes a velocity cutting principle comparable to that utilized in conventional rotary mowers. However, in place of one large cutting blade rotating around a vertical axis, the present invention utilizes a large number of cutters, each rotating in a much smaller circle but all together operating to provide an elongated line of cutting, similar to the reel type mowers. Because of this elongated line of cutting and the multiplicity of cutting teeth operating in separate paths and in much smaller circles, the present construction is much less dangerous to handle than a conventional rotary mower, and because of the greatly lessened danger of throwing stones and other objects, and the greatly decreased danger of cutting off toes, fingers, etc. Also, because of the elongated line of cutting, similar to that of a reel type mower, the mower of this invention provides an even cut on close and terraced lawns (unlike the conventional rotary mower), and there is much less likelihood of "scalping" or digging on terraces and uneven terrain than with an ordinary, conventional, rotary mower.

At the same time, the mower of the present invention, utilizing as it does the velocity cutting principle, will cut close up to trees, walls, and flower beds, and will cut tall grass and weeds, which the ordinary, conventional, reel type mower cannot cut. Also, since the mower of this invention has only a single cutting blade, as contrasted to the separate reel and cutting blade of a reel type mower, it is light weight, compact, and easy to handle without power driven wheels, it does not require excessive power for operation, and there are no close mechanical adjustments (such as those between reel and bed knife in the conventional reel type mower) to maintain.

FIG. 6 is a somewhat diagrammatic showing of an arrangement whereby the desired combined rotary and reciprocatory motion can be imparted to the entire cutting blade, as a unit, as it is moved forward in the direction of arrow L. The blade 1 has a plurality of teeth (such as 2, 3 and 4) arranged linearly along its front edge, as previously described in connection with FIG. 3. The vertical shaft 5 is mounted for rotation in the mower housing, and is rotated at a proper speed by any suitable prime mover, such as a gasoline engine of suitable type. A spur gear wheel 6 is keyed to the lower end of shaft 5, and rotates with this shaft. Two pinions 7 and 8, keyed to the upper ends of the respective vertical shafts 9 and 10, mesh with the gear wheel 6 at opposite sides thereof. The axes of shafts 9 and 10 lie in a common vertical plane (see FIG. 2), that is parallel to the row of cutter teeth on blade 1.

The pinions 7 and 8 have the same number of teeth, which number is much smaller than the number of teeth on gear wheel 6. The gearing described therefore provides a step-up in speed, such that the shafts 9 and 10 rotate much faster than shaft 5. The shafts 9 and 10 are, like shaft 5, mounted for rotation in the mower housing. A crank 11 is rigidly connected to the lower end of shaft 9. Similarly, a crank 12 is rigidly connected to the lower end of shaft 10. The blade 1 is journaled to the ends of cranks 11 and 12, so that the blade is driven by the cranks. As the cranks 11 and 12 rotate with shafts 9 and 10, respectively, the blade 1 is driven with a combined rotary and reciprocatory motion. In this manner, as both ends of the blade move alike in substantially horizontal circles of substantially the same radius, each of the teeth 2—4 is caused to describe a circle of the same radius, since the entire blade 1 has a combined rotary and reciprocatory motion by means of the single blade 1 alone.

The speed of rotation of shafts 9 and 10, and the length of cranks 11 and 12, are such that the diameter of the circles described by the cutting teeth 2, 3, 4, etc. is in correct relationship to the spacing of the teeth as well as their length, and that the linear rotational velocity of the teeth is sufficient to provide the desired shearing or rotary scythe or sickle action.

FIGS. 1, 2, 4 and 5 disclose additional details of the construction of a power lawn mower utilizing this invention. A relatively rigid, strong housing or frame member 13 provides the bearings and supports for the various moving parts of the mower, including the driving engine, driving mechanism, cutting blade, etc. This housing or frame member is provided with a depending flange portion 13a located just in front of the cutting blade 1, in such a position as not to interfere with the motion of the blade. This depending flange portion 13a is a safety guard only, and performs no function in connection with the actual mowing or cutting. This guard prevents undesired contacts between the blade 1 and trees and other objects, without however interfering with the mowing function.

Shaft 5 is mounted for rotation in member 13, by means of suitable bearings. A pulley 14 is keyed to the upper end of shaft 5, this pulley being driven by any suitable prime mover, such as a gasoline engine 15, as by means of a belt 16 which engages pulley 14 and also the drive pulley 17 of engine 15.

The gears 6, 7, and 8 are all enclosed in a gear-box 18 which is suitably secured to the underside of frame member 13. Shaft 9 is mounted for rotation in a cylindrical extension of gear-box 18, as by means of an upper bearing 19 and a lower bearing 20. Shaft 10 is mounted for rotation in a similar manner. The crank 11, which may be rigidly connected to the lower end of shaft 9, is preferably integral with shaft 9, as illustrated in FIG. 5. Likewise, crank 12 is integral with shaft 10.

A hollow cylindrical collar 21 is rigidly attached to the upper face of cutting blade 1, in aligned relation with the depending crank pin portion 11a of crank 11. Collar 21 forms one support for a bearing 22, the other support for which is formed by depending crank pin portion 11a of the crank. In this way, blade 1 is journaled to the end of crank 11, and the blade is driven by said crank.

The same construction is used to journal the blade 1 to the crank pin end of crank 12, so that the cutting blade 1 is driven by the conjoint action of both cranks 11 and 12. The cutting blade is therefore driven with a combined rotary and reciprocatory motion.

The mower is mounted on a pair of wheels 22 and 23 of large diameter mounted for rotation on opposite ends of an axle 24 secured to housing or frame member 13. Another pair of wheels of smaller diameter, one of which is shown at 25, is mounted in trailing relation to wheels 22—23 for rotation on separate axles 26 carried on forks 27 fastened to member 13 and extending downwardly and rearwardly therefrom. Wheels 25 may be carried on casters. A handle 28 has a fork pivoted on the frame and extends rearwardly and upwardly from the mower.

FIG. 7 is a front elevation of a farm mower also utilizing the novel cutting principle of this invention. The cutter blade 1' of the farm mower is driven similarly as in the lawn mower previously described, namely, by means of shafts, gearing, cranks, etc., but in this case the power for driving the blade is transmitted from the power take-off shaft of a tractor to the vertical drive shaft 5 through a stub shaft 29 disposed on a horizontal axis and suitably connected as by means of bevel gearing (not shown) to shaft 5. The frame member 30 in FIG. 7 corresponds to frame member 13 of the lawn mower and supports the cutter blade and its driving mechanism, as well as the axle on which the ground-engaging wheels 31 are mounted for rotation. A drawbar 32 secured to frame member 30 enables the farm mower to be pulled behind a tractor, and the power for driving the cutting blade 1' is derived from this same tractor, through a suitable drive connection between the power take-off shaft of the tractor and shaft 29.

It should be evident from the foregoing description, that the objects of this invention have been accomplished. The unique construction and cutting action of the mowers described give all the advantages of the conventional rotary and reel type mowers and more, with none of their disadvantages.

It is believed the foregoing description conveys a good understanding of the objects and advantages of my invention. The appended claims have been drawn to cover all legitimate modifications and adaptations.

I claim:

1. A vegetation mower comprising a mobile frame, at least two substantially vertical shafts rotatably mounted in said frame, said shafts having crank arms on their lower end portions, a cutter blade journaled on the terminal portions of said crank arms, and power means operatively connected to at least one of said shafts.

2. A vegetation mower comprising a mobile frame, at least two substantially vertical shafts rotatably mounted in said frame, said shafts having crank arms on their lower end portions, a cutter blade journaled on the terminal portions of said crank arms, a power operated drive gear turning on a vertical axis in a vertical plane between said shafts, and driven gears meshing with the drive gear and transmitting drive to said shafts.

3. A mower as set forth in claim 1 wherein the cutter blade is toothed and the teeth of the cutter blade are disposed in laterally spaced relation in a substantially horizontal row cross-wise of the direction of travel of the mower in mowing, and each is tapered forwardly to a point and has cutting edges longitudinally of both sides to cut with a rotary scythe action.

4. A mower as set forth in claim 1 wherein the cutter blade is toothed and the teeth of the cutter blade are disposed in laterally spaced relation in a substantially horizontal row cross-wise of the direction of travel of the mower in mowing, and each is tapered forwardly to a point and has cutting edges longitudinally of both sides to cut with a rotary scythe action, the radii of said crank arms being equal and so related to the distance between neighboring cutter teeth that the diameter of the circles described by the teeth is at least equal to the distance between the pointed ends of neighboring cutter teeth.

5. A mower as set forth in claim 1 wherein the cutter blade is toothed and the teeth of the cutter blade are disposed in laterally spaced relation in a substantially horizontal row cross-wise of the direction of travel of the mower in mowing, the radii of said crank arms being equal and so related to the distance between neighboring cutter teeth that the diameter of the circles described by the teeth is at least equal to the distance between neighboring cutter teeth.

6. A mower as set forth in claim 1 wherein the cutter blade is toothed and the teeth of the cutter blade are disposed in laterally spaced relation in a substantially horizontal row cross-wise of the direction of travel of the mower in mowing, the radii of said crank arms being equal and so related to the distance between neighboring cutter teeth that the diameter of the circles described by the teeth is at least equal to the distance between neighboring cutter teeth, the drive speed of said cranks being such that the linear rotational velocity of said cutter teeth is sufficient to shear off the vegetation to be mowed by a rotary scythe action.

7. A mower as set forth in claim 1 including a depending guard in a substantially vertical plane carried on the frame in front of the cutter blade and terminating in a horizontal plane slightly above the horizontal plane of operation of the cutter blade.

References Cited in the file of this patent

UNITED STATES PATENTS

| | | |
|---|---|---|
| 401,714 | Murray | Apr. 16, 1889 |
| 1,106,196 | England | Aug. 4, 1914 |
| 1,536,514 | Mehls | May 5, 1925 |
| 2,492,290 | Isserstedt | Dec. 27, 1949 |
| 2,616,238 | Hodgkinson et al. | Nov. 4, 1952 |
| 2,625,784 | Kelsey | Jan. 20, 1953 |
| 2,682,142 | Clark | June 29, 1954 |
| 2,724,941 | Zwiesler | Nov. 29, 1955 |
| 2,765,611 | King | Oct. 9, 1956 |
| 2,808,883 | Knokey | Oct. 8, 1957 |
| 2,839,113 | Townsend | June 17, 1958 |

FOREIGN PATENTS

| | | |
|---|---|---|
| 651,031 | Great Britain | Mar. 7, 1951 |